US012629647B2

(12) United States Patent
Locher et al.

(10) Patent No.: US 12,629,647 B2
(45) Date of Patent: May 19, 2026

(54) CHANGING SYSTEM AND METHOD FOR CHANGING A MIXER

(71) Applicant: Dürr Systems AG, Bietigheim-Bissingen (DE)

(72) Inventors: Bernd Locher, Knittlingen (DE); Sebastian Gries, Heilbronn (DE); Alexander Fitterer, Gemmrigheim (DE); Rik Brodersen, Sachsenheim (DE)

( * ) Notice: Subject to any disclaimer, the term of this patent is extended or adjusted under 35 U.S.C. 154(b) by 298 days.

(21) Appl. No.: 18/249,742

(22) PCT Filed: Oct. 12, 2021

(86) PCT No.: PCT/EP2021/078131
§ 371 (c)(1),
(2) Date: Apr. 20, 2023

(87) PCT Pub. No.: WO2022/089932
PCT Pub. Date: May 5, 2022

(65) Prior Publication Data

US 2024/0009639 A1 Jan. 11, 2024

(30) Foreign Application Priority Data

Oct. 26, 2020 (DE) ..................... 10 2020 128 118.8

(51) Int. Cl.
*B01F 33/501* (2022.01)
*B01F 25/431* (2022.01)
(Continued)

(52) U.S. Cl.
CPC ........ *B01F 33/5013* (2022.01); *B01F 25/431* (2022.01); *B01F 35/10* (2022.01);
(Continued)

(58) Field of Classification Search
CPC B01F 25/431; B01F 33/5013; B01F 33/5025; B01F 35/12; B01F 35/10;
(Continued)

(56) References Cited

U.S. PATENT DOCUMENTS 4,273,506 A * 6/1981 Thomson ............... B65G 47/90 901/29
5,979,794 A * 11/1999 DeFillipi ............. B05C 11/1007 239/432
(Continued)

FOREIGN PATENT DOCUMENTS

CN 110856834 A 3/2020
CN 111052339 A 4/2020
(Continued)

OTHER PUBLICATIONS

International Search Report and Written Opinion for PCT/EP2021/078131 mailed Jan. 31, 2022 (14 pages; with English translation).
(Continued)

*Primary Examiner* — David Colon-Morales
(74) *Attorney, Agent, or Firm* — Taft Stettinius & Hollister LLP; Thomas E. Bejin; John W. Carpenter

(57) ABSTRACT

An automated change system for changing a mixer, comprising a mixing device, having a mixer, for mixing at least two different components for a multi-component application agent for application onto a workpiece, and a handling device for moving the mixing device, wherein the change system comprises a change station for depositing a mixing device with a mixer to be changed and for receiving a mixing device with a new mixer.

21 Claims, 8 Drawing Sheets

(51) Int. Cl.

| | |
|---|---|
| ***B01F 35/10*** | (2022.01) |
| ***B01F 35/40*** | (2022.01) |
| ***B01F 101/00*** | (2022.01) |
| ***B01F 101/36*** | (2022.01) |

(52) U.S. Cl.
CPC ...... *B01F 35/40* (2022.01); *B01F 2101/2305* (2022.01); *B01F 2101/36* (2022.01)

(58) Field of Classification Search
CPC .................. B01F 35/41; B01F 2101/36; B01F 2101/2305; B25J 9/026; B25J 18/00; B65G 47/90
See application file for complete search history.

(56) References Cited

U.S. PATENT DOCUMENTS

| | | | | |
|---|---|---|---|---|
| 6,698,617 | B1 * | 3/2004 | Szymanski | B05B 15/65 137/15.01 |
| 9,120,229 | B2 * | 9/2015 | Roth | B25J 9/0018 |
| 10,994,299 | B2 * | 5/2021 | Minichev | B29B 7/74 |
| 11,749,547 | B2 * | 9/2023 | Yoshida | H01L 21/67259 414/751.1 |
| 12,036,522 | B2 * | 7/2024 | Rosenauer | B01F 35/71805 |
| 2002/0104900 | A1 * | 8/2002 | Borcea | B05B 13/0627 239/548 |
| 2004/0129208 | A1 | 7/2004 | Nolte et al. | |
| 2008/0056065 | A1 * | 3/2008 | Keller | B05C 17/00506 366/339 |
| 2019/0054437 | A1 * | 2/2019 | Hopkins | B29B 7/582 |
| 2019/0077022 | A1 * | 3/2019 | Murakami | A61J 1/2096 |
| 2019/0232330 | A1 * | 8/2019 | Burock | B05C 11/1047 |

FOREIGN PATENT DOCUMENTS

| | | | | |
|---|---|---|---|---|
| DE | 19852079 | A1 * | 5/2000 | B05B 13/0431 |
| DE | 102004033223 | B3 | 11/2005 | |
| DE | 60121409 | T2 | 7/2007 | |
| DE | 102010019771 | A1 | 11/2011 | |
| DE | 102012206418 | A1 | 10/2013 | |
| DE | 102014017856 | A1 | 6/2016 | |
| DE | 102018119838 | A1 | 2/2020 | |
| DE | 102019121347 | A1 * | 2/2021 | B05C 17/00553 |
| DE | 102019130612 | A1 | 5/2021 | |
| EP | 1245296 | A1 * | 10/2002 | B05B 12/1454 |
| EP | 1375008 | A2 * | 1/2004 | B29B 7/404 |
| EP | 1892033 | A1 * | 2/2008 | B01F 33/822 |
| EP | 2532444 | A1 | 12/2012 | |
| EP | 3610941 | A1 | 2/2020 | |
| ES | 1268854 | U * | 5/2021 | B01F 33/501 |
| ES | 2984331 | T3 * | 10/2024 | B33Y 30/00 |
| JP | H06226178 | A * | 8/1994 | B05C 17/00566 |
| JP | H097509 | A | 1/1997 | |
| KR | 20100091809 | A | 8/2010 | |
| WO | WO-2006128561 | A1 * | 10/2006 | B05B 15/50 |
| WO | WO-2010128384 | A1 * | 11/2010 | B01F 29/20 |
| WO | WO-2017190944 | A1 * | 11/2017 | B01F 35/7547 |
| WO | WO-2020035228 | A1 * | 2/2020 | B05C 5/0225 |
| WO | 2021152557 | A1 | 8/2021 | |
| WO | WO-2022110896 | A1 * | 6/2022 | B25J 11/0075 |

OTHER PUBLICATIONS

International Search Report and Written Opinion mailed Feb. 14, 2022 for PCT/EP2021/078948 (14 pages; with English translation).
Office Action from German Patent Office in related application DE10 2020 128 115.3 mailed Jul. 23, 2021 (14 pages; with English machine translation).
Office Action from German Patent Office for related application No. DE 10 2020 128 118.8 mailed Feb. 25, 2021 (12 pages; with English machine translation).
German Patent Office Official Communication for related application No. DE 10 2020 128 118.8 mailed Mar. 9, 2021 (2 pages; with English machine translation).
Korean Patent Office Notice of Preliminary Rejection for related application No. 10-2023-7017898 mailed Sep. 30, 2025 (19 pages; with English translation).
Chinese Patent Office Action and Search Report for related application No. 202180073324.6 mailed Dec. 23, 2025 (9 pages; English translation of Search Report).

* cited by examiner

CHANGING SYSTEM AND METHOD FOR CHANGING A MIXER

CROSS-REFERENCE TO RELATED APPLICATIONS

This application is a national stage of, and claims priority to, Patent Cooperation Treaty Application No. PCT/EP2021/078131, filed on Oct. 12, 2021, which application claims priority to German Application No. DE 10 2020 128 118.8, filed on Oct. 26, 2020, which applications are hereby incorporated herein by reference in their entireties.

FIELD

The disclosure relates to a change system for changing a mixer, preferably for a multicomponent adhesive. The disclosure also relates to a corresponding changing method.

BACKGROUND

Mixing devices, having mixers, and handling devices, such as robots for moving the mixing devices, are known from the prior art in a wide variety of embodiments. The mixing devices are used to mix different components (e.g. hardener and adhesive) of a 2-component adhesive and to apply the mixed 2-component adhesive, e.g. onto motor vehicle components. One problem, for example, is that after a certain change interval or after noticeable wear, mixers whose function is impaired have to be replaced by new mixers. These changes are usually carried out manually by a worker inside an application cell and thus inside a potentially hazardous area. On the one hand, there can be a risk of individual errors. On the other hand, there can be the risk of the worker coming into contact with harmful substances, for example. The manual change is carried out in particular as follows: Releasing of fastening screws, removal of a mixer to be changed, insertion of a new mixer and mounting and fastening by means of fastening screws.

DETAILED DESCRIPTION

Figure 1:
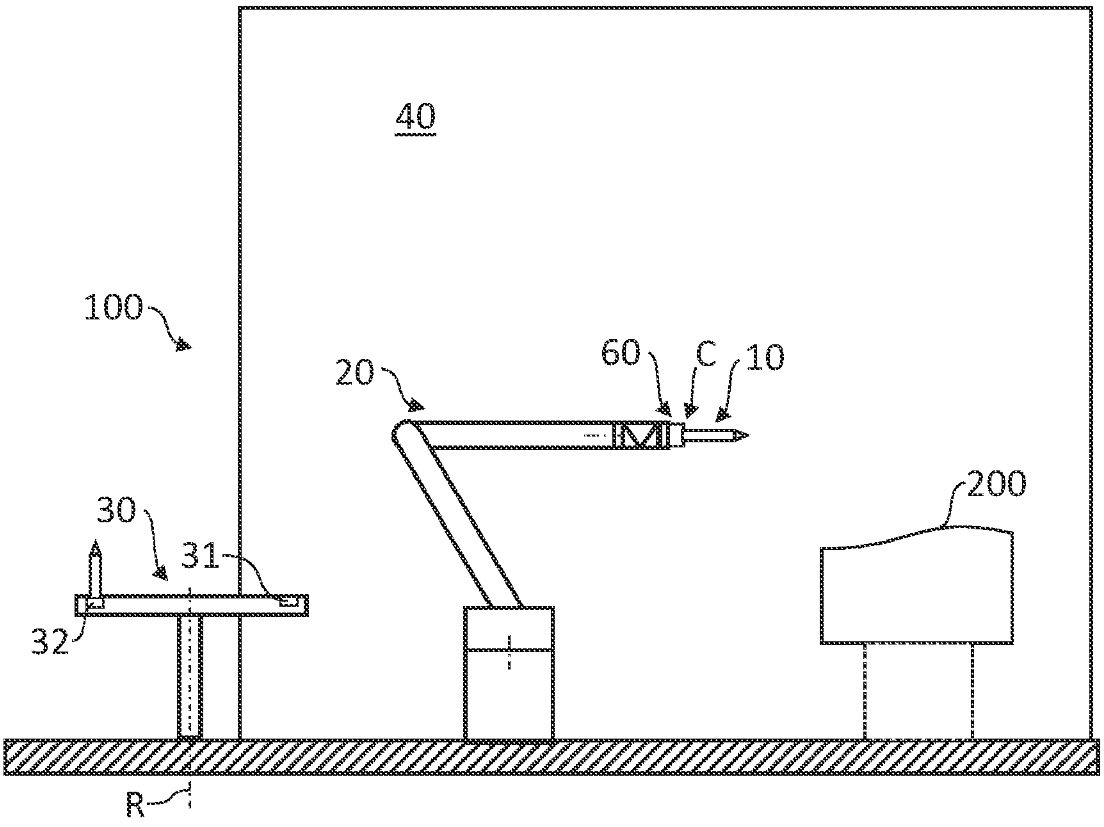
FIG. 1 shows a schematic view of a change system according to an exemplary embodiment of the disclosure.

An object of the disclosure is to provide an improved and/or alternative possibility of changing mixers which are, for example, impaired in their function.

The disclosure relates to a preferably automated change system for changing a mixer (e.g. whose function is impaired and thus in particular is to be changed).

The change system comprises a mixing device, having a mixer, for mixing at least two different components for a multi-component application agent (e.g. adhesive (preferably resin) or paint), wherein the expediently mixed multi-component application agent is used for application onto a workpiece.

The workpiece is preferably a motor vehicle component, e.g. a motor vehicle body and/or an add-on part therefor.

The multi-component application agent is preferably a multi-component adhesive (e.g. a 2 C adhesive, preferably with resin) or a multi-component paint (e.g. a 2 C paint). The multicomponent application agent can, for example, comprise at least one hardener and at least one adhesive.

The change system comprises a handling device (e.g. a robot with preferably at least three degrees of freedom) for moving the mixing device, in particular along the workpiece.

The change system is characterized in particular in that it comprises a change station (e.g. a changing depot).

The change station is used in particular for the preferably automated depositing of a mixing device (e.g. to be changed in whole or in part) with a mixer to be changed and/or e.g. for the preferably automated receiving of a mixing device (e.g. new in whole or in part) with a new mixer.

The change system thus enables an in particular automated changing process.

On the one hand, for example, the change system enables that a mixing device with a mixer to be changed can be deposited in the change station, preferably in an automated manner.

On the other hand, for example, the change system enables that the change station can be equipped (e.g. manually or in an automated manner) with one or more mixing devices with a new mixer, preferably during running process (e.g. production and/or application) and/or without a worker having to enter an application cell.

An advantage of the change system is therefore, for example, a possible stocking of one or more mixing devices with a new mixer.

A mixing device with a new mixer can preferably in an automated manner be grasped by the handling device out of the change station, such that the application process can be carried out with a mixing device with a new mixer.

The change station can be arranged, in particular, within reach of the handling device. It is possible that the handling device is configured to position, in particular in an automated manner, in the change station a mixing device with a mixer to be changed, and/or to receive a mixing device with a new mixer out of the change station, preferably in an automated manner.

The change station can preferably be configured movable (e.g. manually and/or motorically), e.g. rotatable and/or translationally movable.

It is preferred that the change station is movable, e.g. in an automated manner, preferably controlled by a control device.

It is possible that the change system has a drive unit (e.g. a motor, in particular an electric motor) to move the change station, preferably in an automated manner, e.g. to rotate and/or to move translationally.

The handling device is preferably arranged in an application cell that is, for example, closed or at least partially open, in which, in particular, the application of the multi-component application agent onto the workpiece can take place.

It is possible that the change station is arranged at least partially inside the application cell and/or the change station is arranged at least partially outside the application cell.

It is possible that the change station is movable, preferably in order to move, for example, with at least one mixing device with a new mixer at least partially into the application cell and/or in order to move, for example, with at least one mixing device with a mixer to be changed at least partially out of the application cell.

The change station can, for example, comprise at least two receivers for at least two mixing devices, e.g. at least one receiver for at least one mixing device with a mixer to be changed and at least one receiver for at least one mixing device with a new mixer.

The receivers can be configured, for example, as recesses, pockets or in the form of other holding means, etc.

It is possible that a contour (in particular inner contour) of the receivers corresponds at least partially with a contour (in particular outer contour) of the mixing device, preferably such that the mixing device is fixable in particular relative to its circumferential and/or axial direction, preferably in a form-fitting manner.

The change station can, for example, comprise a turntable and/or be movable along a rail system.

It is possible that the mixing device and/or a change insert (e.g. an elongated tube piece, a tube stub, a reducing sleeve, etc.) comprises at least two separate lines, e.g. in order to be able to guide the at least two different components separately from one another, preferably to the mixer.

It is possible that the at least two separate lines have passage cross sections that taper towards the mixer.

The at least two separate lines can, for example, at least partially extend parallel and/or at an acute angle to each other expediently in the direction of the mixer.

The change insert or the mixing device in general can, for example, comprise a tapered section which can, in particular, taper towards the mixer. The tapered section preferably forms a tip of the change insert and/or is at least partially exposed in the mixing device.

The tapered section can be formed, for example, as part of the change insert or as part of a base section of the mixing device.

The tapered section can preferably comprise substantially the shape of a taper tip or cone tip, e.g. with an at least partially flat, concave and/or convex lateral surface.

It is possible that the at least two separate lines with preferably two separate outlet openings open in the tapered section.

It is possible that at least one bushing (e.g. a change bushing) is accommodated in the change insert, in particular in a releasable manner, and the at least one bushing can comprise the at least two separate lines or at least one of the at least two separate lines.

The at least two separate lines can, for example, extend at least up to the mixer (e.g., open out in or substantially immediately upstream of the mixer), preferably such that mixing can only be initiated in the mixer.

The tapered section can, for example, protrude from a base section of the mixing device (preferably at least up to the mixer) and/or project (preferably at least partially exposed) into an application tube of the mixing device.

It is possible that the change insert comprises an at least partially substantially cylindrical, conical and/or frustoconical basic structure.

The change insert, the at least one bushing, the base section, the application tube and/or the mixer can be made of plastic, for example.

It is possible that the mixing device can comprise a connecting surface, in particular an inner connecting surface, for releasable connection to the tapered section. The connecting surface is preferably substantially conical in shape, e.g. with a flat, concave and/or convex lateral surface.

The tapered section and the connecting surface can, in particular, have a substantially identical angular position in their contact area, such that a tight connection can preferably be ensured via their structural shape, in particular also during mixer changing.

It is possible that the tapered section, in particular in its circumferential direction, can be brought into connection with the connecting surface in a substantially tight and/or prestressed manner.

It is possible that the handling device carries an application head, for example, indirectly or directly.

The application head serves in particular for supplying the at least two different application agents to the mixing device and/or for mounting the mixing device, in particular in a releasable manner.

The application head can, for example, be part of an applicator with a metering device for metering the at least two different components.

The mixing device preferably comprises an interface for releasable connection to the application head. The mixing device and the application head can thus in particular comprise a mount for releasable connection to each other.

The handling device can be configured, for example, to place in the change station a mixing device with a mixer to be changed and to, in particular, move the application head (e.g. to rotate and/or to move translationally), such that the interface is released and the mixing device with a mixer to be changed can be deposited in the change station.

Alternatively or additionally, the handling device can be configured, for example, to connect in particular the application head to a mixing device with a new mixer placed in the change station and/or to move (e.g. to rotate and/or to move translationally) in particular the application head, such that the interface is closed and the mixing device with a new mixer can be removed out of the change station.

The interface can preferably be opened and/or closed by means of at least one opening and/or closing movement (e.g. transmittable via the application head) that can be generated by the handling device.

The handling device can comprise, for example, a robot with at least 3 degrees of freedom, in particular an articulated arm robot or a gantry robot.

The robot can be, for example, a robot with a plurality of pivotable robot arms and preferably having a robot wrist with at least two or three degrees of freedom.

The mixing device preferably comprises a base section and/or a preferably elongated application tube. The mixing device preferably forms an assembly group comprising, in particular, the mixer and a base section and/or an application tube.

The base section and the application tube are mountable to each other, preferably in a releasable manner.

The application tube and/or the base section can be made, for example, of metal and/or plastic.

The mixer can be accommodated, for example, substantially in the application tube, for example in a releasable manner, in particular changeably. The application tube can in particular form a support tube for the mixer. The mixer can, for example, also extend into the base section.

The base section preferably comprises an interface for releasable connection to the application head.

The mixer is preferably a helical mixer (e.g. a screw mixer or a Kenics mixer) and/or a static mixer.

For example, the mixer can comprise at least one helical, screw-shaped, lamellar, and/or lattice-shaped mixing element that can, for example, extend along the application tube.

It is possible that the change insert forms a separate change component, in particular because sticking, clogging or wear etc. can occur in or on the change insert.

The change insert can be insertable (in particular at least partially), for example, into the mixing device (expediently into the base section and/or into the application tube) and/or into the application head, preferably in a releasable, in particular changeable, manner.

The change insert can, for example, extend through the interface.

Removal of a change insert to be changed and insertion of a new change insert can take place, for example, via a front side of the mixing device and/or a front side of the application head.

It is possible that the change insert comprises a, e. g. cylindrical, basic structure, preferably with different outer diameters, wherein, for example, an outer diameter facing the application head can be larger than an outer diameter facing the mixer.

The change insert is preferably configured for a substantially accurately fitting and/or dead space free insertion into the mixing device and/or into the application head.

For example, the change insert can extend substantially coaxially with the mixer, the base section, the application tube and/or the application head. Alternatively or additionally, the change insert can be arranged, for example, substantially centrally in the mixing device and/or in the application head.

The mixing device (in particular the base section and/or the application tube) and/or the application head can comprise a receiver for receiving the change insert, for example, in an accurately fitting manner and/or substantially dead space free manner.

It is possible that the change insert comprises at least one fastening recess (e.g., a groove, a hole, a cavity, etc.) preferably in its lateral surface and at least one in particular pluggable and/or threadless retaining element (e.g. at least one retaining bolt or retaining bracket, in particular a spring bracket) is provided in order to fasten the change insert expediently by means of the at least one fastening recess.

The application head can comprise at least one fastening opening (e.g. a through hole) preferably in its lateral surface, wherein the at least one retaining element is configured for engaging with the at least one fastening recess and with the at least one fastening opening.

The at least one retaining element can be engageable with the change insert in particular from outside (e.g. through the application head).

The at least one retaining element can, for example, comprise at least one bolt or bracket (e.g. a spring bracket) for insertion into and withdrawal from the at least one fastening recess and the at least one fastening opening.

The at least one fastening recess, the at least one fastening opening and/or the at least one retaining element can preferably be formed threadless.

The change system can comprise, for example, a control device.

The control device can be configured, for example, to ensure that, after reaching a change interval and/or after (preferably automated and/or sensor-based) detection (e.g. of wear, damage and/or functional impairment) of a mixer to be changed, a mixing device with a mixer to be changed is deposited in the change station and/or a mixing device with a new mixer is received out of the change station.

In order to detect mixers to be changed, the change system can, for example, comprise a sensor system. The sensor system can, for example, be configured to detect application results from which conclusions can be drawn about mixers that should be changed.

The control device can, for example, be configured to control movements of the change station and/or the handling device to be carried out in particular for a changing process.

The control device can, for example, be configured to ensure that the change station for example with at least one mixing device with a new a mixer moves at least partially into the application cell and/or with at least one mixing device with a mixer to be changed moves at least partially out of the application cell.

The change station can, for example, be equipped with any number of receivers (e.g. deposit locations), such that these can preferably be completely replaced once depending on number in expediently large time intervals.

It should be mentioned that the disclosure can be applied in particular to 2-component adhesions and/or castings of heat-conducting media.

It should also be mentioned that the disclosure can comprise a change system for e.g. partially or fully automated changing of a mixer (e.g. including base section and/or application tube).

It is possible, for example, that a mixing device with, in particular, a mixer to be changed and optionally the application tube and optionally the base section is deposited in the change station, wherein the mixer and optionally the application tube and optionally the base section can be replaced.

It is possible, for example, that a mixer to be changed and the application tube and optionally the base section can be changed (e.g. disposed).

However, it is also possible, for example, that (in particular only) a mixer to be changed can be changed (e.g. disposed), but the application tube and/or the base section can preferably be reused with a new mixer.

For example, it is also possible that a mixer to be changed and the application tube can be changed (e.g. disposed), but, for example, the base section can preferably be reused with a new mixer and/or a new application tube.

It is also possible that a mixing device together with mixer, application tube and base section is changed and replaced by a mixing device with, in particular, new mixer, new application tube and new base section.

The change of the mixing device, the mixer, the application tube and/or the base section can be carried out expediently manually or automatically, in particular outside the application cell.

The application cell can, for example, be laterally delimited by one or more fences, barriers, walls, panes, etc.

The disclosure also comprises a preferably automated changing method for changing a mixer. The changing method can preferably be carried out using a change system as disclosed herein.

The changing method comprises a mixing device, having a mixer, wherein by means of the mixing device at least two different components for a multi-component application agent for application onto a workpiece can be mixed, and a handling device which can move the mixing device preferably along the workpiece.

The changing method is characterized in particular in that in a change station a mixing device with a mixer (in particular to be changed) is deposited preferably in an automated manner and/or, for example, a mixing device with a (in particular new) mixer is received preferably in an automated manner.

The preferred exemplary embodiments of the disclosure described with reference to the figures coincide in part, wherein similar or identical parts are provided with the same reference signs and reference can also be made to the description of other exemplary embodiments for their explanation. For illustration purposes, not all parts in all figures are provided with reference signs.

FIG. 1 shows a change system 100 for expediently partially or fully automated changing of a mixing device 10 according to an exemplary embodiment of the disclosure.

The change system 100 comprises a mixing device 10 with mixer 13 (e.g. FIG. 2) for mixing at least two different components (e.g. hardener and adhesive) for a multi-component application agent, wherein the expediently mixed multi-component application agent is used for application onto a workpiece 200. The multi-component application agent is preferably a 2 C adhesive (e.g. comprising resin).

The change system 100 also comprises a handling device 20 (e.g. an articulated arm robot) for moving the mixing device 10 along the workpiece 200.

The handling device 20 carries, expediently upstream of the mixing device 10, an application head 60, via which the at least two different components can be supplied to the mixing device 10.

The mixing device 10 comprises an interface C, via which the mixing device 10 is connected to the application head 60 in a releasable manner.

The application head 60 thus serves for supplying the at least two different components to the mixing device 10 and for releasable mounting the mixing device 10. The application head 60 can be connected expediently indirectly or directly to the handling device 20.

The handling device 20 together with the application head 60 and the mixing device 10 is arranged in an application cell 40, such that the application of the multi-component application agent onto the workpiece 200 can take place in the application cell 40.

A feature is that the change system 100 represents a change system 100 for expediently partially or fully automated changing of mixers 13 which are in particular impaired in their function. It comprises a change station 30 for, in particular, automated depositing of a mixing device 10 with mixer 13 to be changed and preferably for, in particular, automated receiving of a mixing device 10 with new mixer 13. In the exemplary embodiment of FIG. 1, the change station 30 is configured as a turntable rotatable about an axis of rotation R, wherein a drive unit can be provided to move the change station 30 in an automated manner.

The change station 30 is preferably arranged partially inside and partially outside the application cell 40. However, it can also be configured to move, for example, completely into and completely out of the application cell 40.

The change station 30 comprises at least two receivers 31, 32 for at least two mixing devices 10, namely at least one receiver 31 for at least one mixing device 10 with a mixer 13 to be changed and at least one receiver 32 for at least one mixing device 10 with a new mixer 13.

An inner contour of the receivers 31, 32 can correspond to an outer contour of the mixing device 10, preferably such that the mixing device 10 can be fixed relative to its circumferential direction and/or form-fittingly in the inner contour 31, 32, whereby it can be made possible, for example, that the interface C can be opened or closed by at least one rotational movement of the application head 60 that can be generated by the handling device 20.

On the one hand, the handling device 20 can be configured to place in the change station 30 a mixing device 10 with mixer 13 to be changed and to move (e.g. to rotate and/or to move translationally) the application head 60, such that the interface C can be released and the mixing device with mixer 13 to be changed can be deposited in the change station 30.

On the other hand, the handling device 20 can be configured to bring the application head 60 into connection with a mixing device 10 with a new mixer 13, placed in the change station 30, and to move the application head 60 (e.g. to rotate and/or move translationally), such that the interface C can be closed and the mixing device 10 with a new mixer 13 can be removed out of the change station 30.

The opening and closing of the interface C, and thus in particular a mounting of a mixing device 10 with new mixer 13 to the application head 60 and a dismounting of a mixing device 10 with mixer 13 to be changed from the application head 60, is thus preferably performed via opening and closing movements of the handling device 20 and consequently via opening and closing movements of the application head 60.

FIG. 1 shows, for example, that the change station 30 can be equipped with one or more mixing devices 10 with a new mixer 13 (e.g. manually or in an automated manner), in particular during a running process (e.g. production and/or application) and, in particular, without a worker having to enter the application cell 40.

Advantages are thus in particular that for mixer changes, for example, no manual activities are required in the application cell 40 and thus in the hazardous area, no in particular lengthy interruptions of the production flow are required because of the mixer changes and/or, for example, individual errors can be avoided at mixer changes. In order to keep the downtime for manually performed mixer changes as low as possible, workers usually work under time pressure and thus under increased stress, which is associated with an increased susceptibility to errors.

A further advantage is, for example, that in particular unforeseeable necessary mixer changes can be (e.g. detected by a sensor system and) carried out in an automated manner and thus preferably quickly. In the event of unplanned wear, damage, etc. of a mixer 13, a mixer change can thus be carried out flexibly and within a short time in an automated manner, in particular without the need for intervention by a worker.

Set-up times for new mixers 13 can be advantageously carried out in a planned manner, e.g. planned downtimes.

Figure 2:
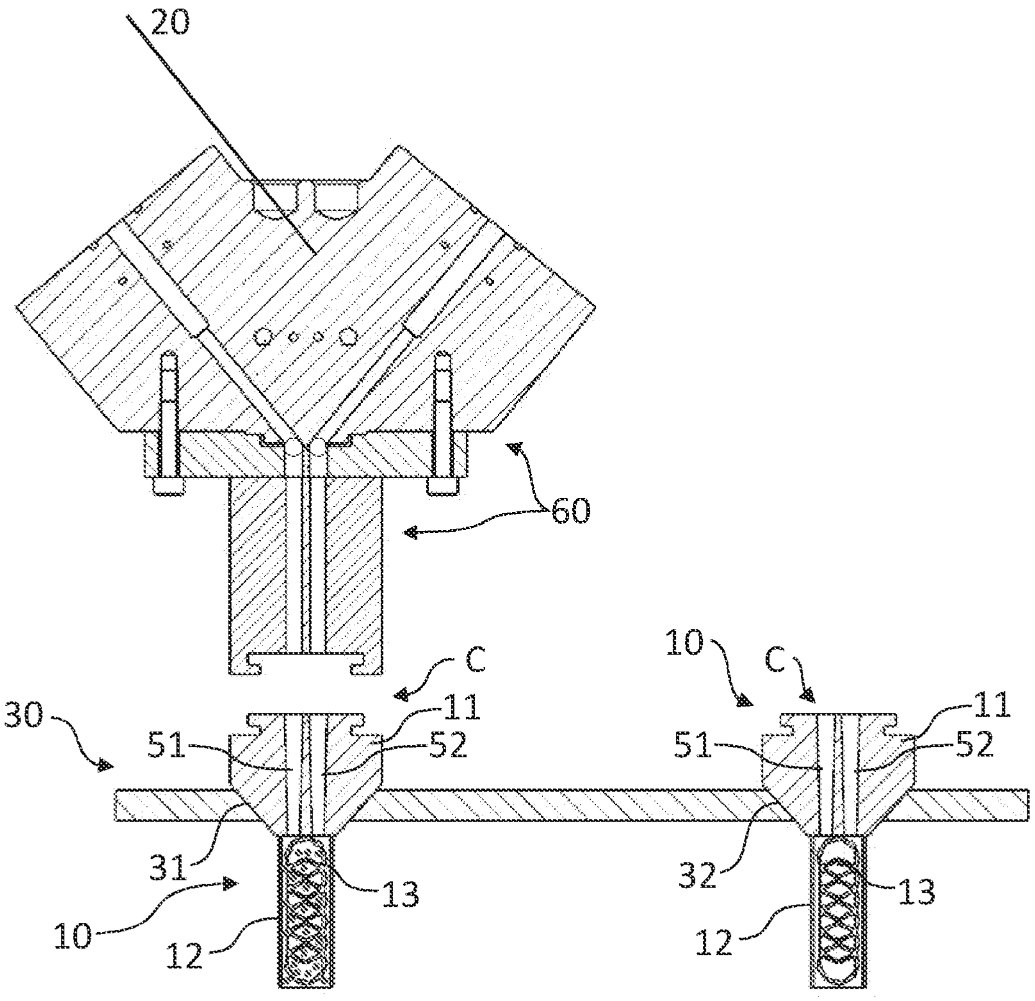
FIG. 2 shows in particular an application head as well as a mixing device with a mixer to be changed (left) and a mixing device with a new mixer (right) in a change station.

FIG. 2 shows in particular a view of the application head 60 as well as a mixing device 10 with mixer 13 to be changed in the change station 30 (left in FIG. 2) and a mixing device 10 with new mixer 13 in the change station 30 (right in FIG. 2).

FIG. 2 shows the application head 60 carried by the handling device 20, which is only shown schematically, and the mixing device 10 with a mixer 30 to be changed in a state already released from each other (interface C released).

The mixing device 10 can expediently comprise a base section 11 and an application tube 12, wherein the mixer 13 for mixing the at least two components is accommodated at least largely in the application tube 12. The mixer 13 is preferably a static mixer, in particular a helical mixer. The mixer 13 can, for example, be accommodated in the application tube 12 in a releasable or non-releasable manner.

The interface C can expediently be formed on the base section 11.

The mixing device 10 preferably forms an assembly group which can comprise the mixer 13 and, in particular, the application tube 12 and/or the base section 11.

The mixing device 10, in particular the base section 11, comprises at least two separate lines 51, 52 to guide the at least two different components separately from one another towards mixer 13.

The at least two separate lines 51, 52 can, for example, be incorporated into the base section 11.

Figure 9:
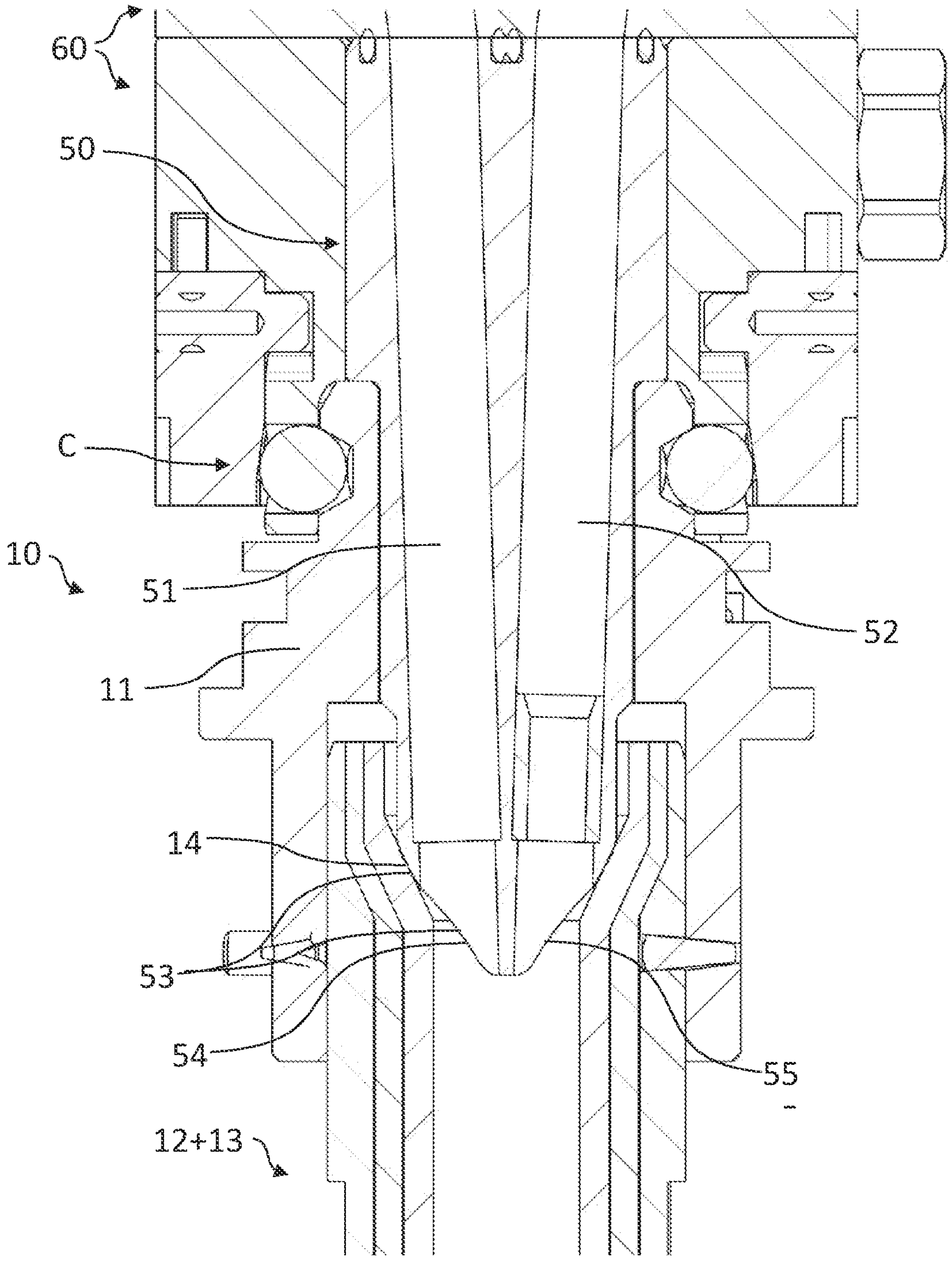
FIGS. 9 and 10 show different views in particular of a part of the mixing device, a change insert and a part of the application head.
Figure 10:
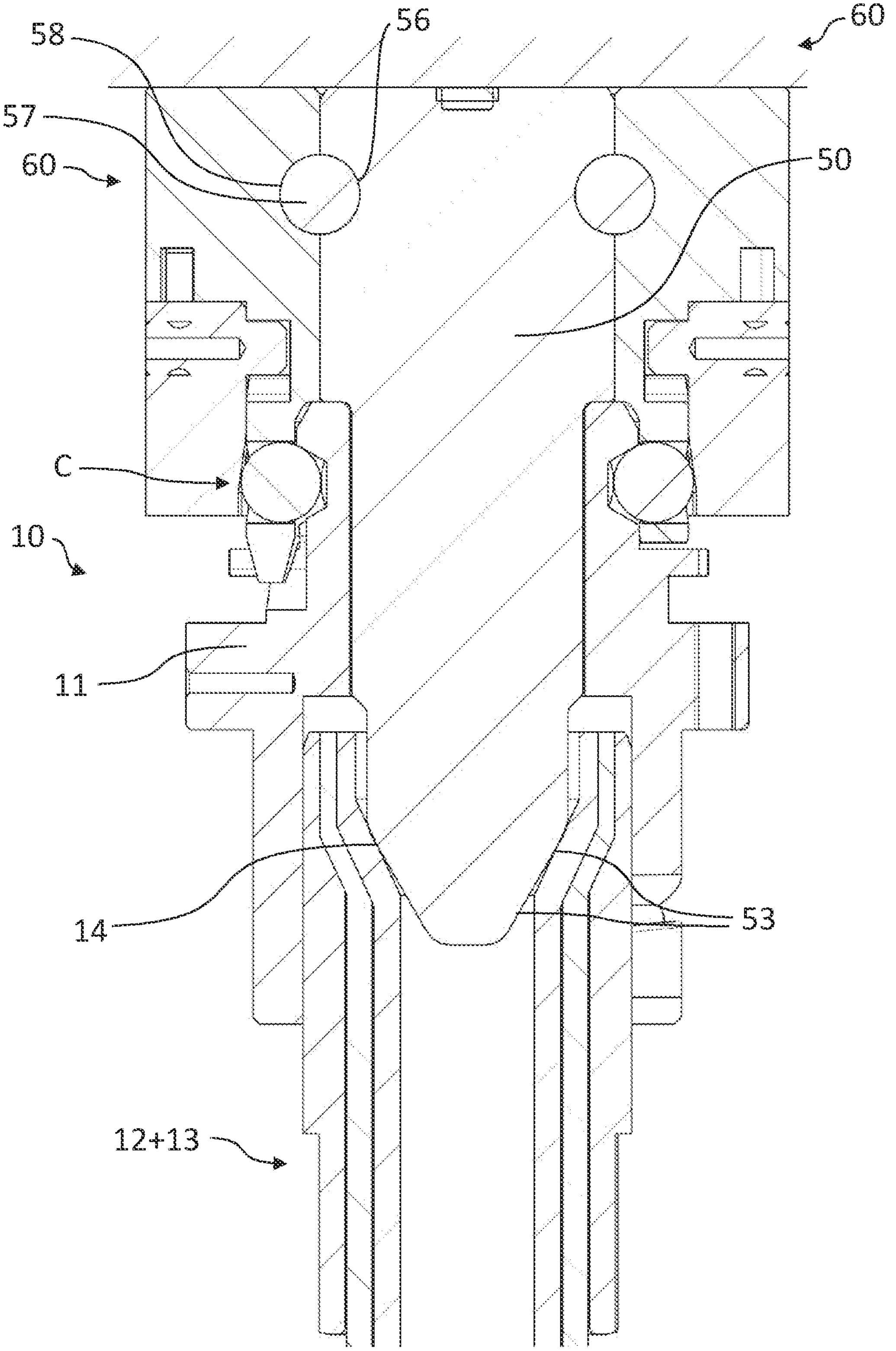

However, it is also possible that the at least two separate lines 51, 52 are provided in a separate changeable change insert 50 (e.g. FIGS. 9 and 10). The change insert 50 can be inserted into the mixing device 10 and preferably into the application head 60 in a releasable manner and thus in particular in a changeable manner.

The change insert 50 thus forms a change component, in particular because, for example, stickings, cloggings or wear etc. can occur in or on the change insert 50.

Figure 3:
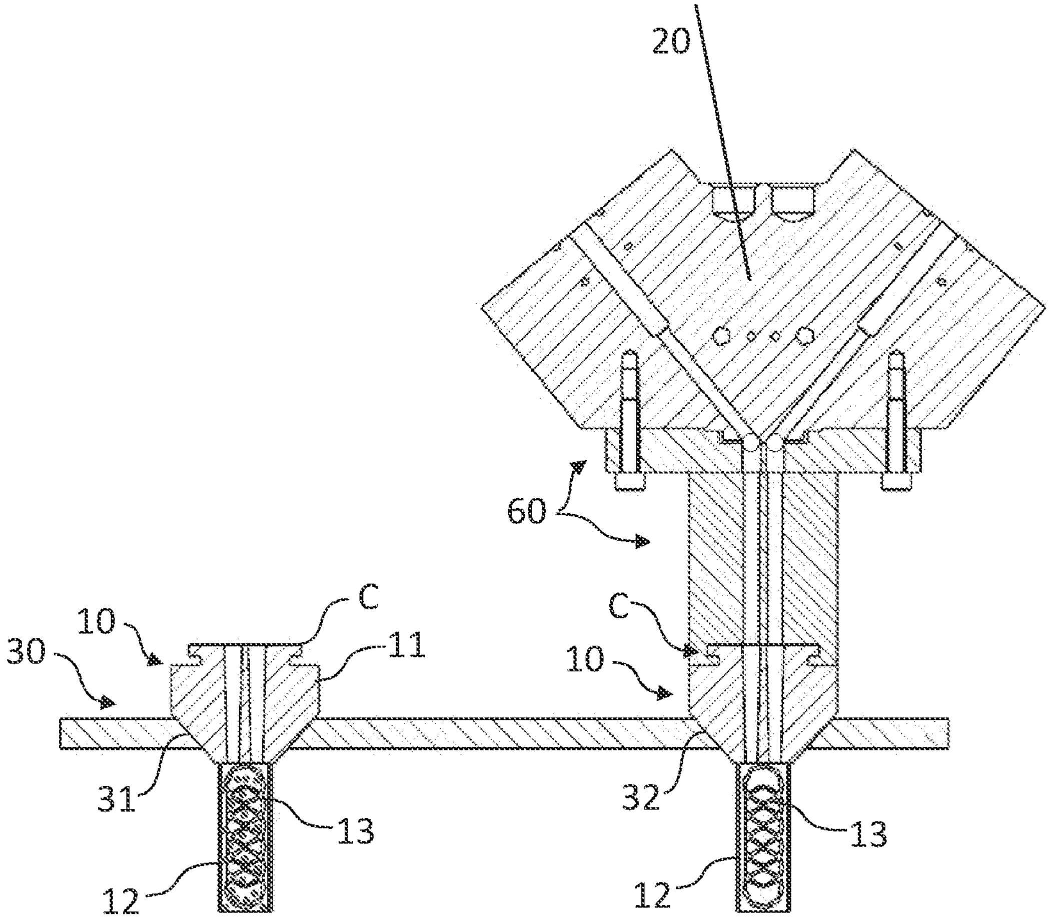
FIG. 3 shows in particular the application head and the mixing device with a new mixer in a state mounted to each other.

FIG. 3 shows in particular a view of the application head 60 as well as the mixing device 10 with a mixer 13 to be changed in the change station 30 (in FIG. 2 left) and the mixing device 10 with a new mixer 13 in the change station 30 (in FIG. 2 right).

FIG. 3 shows the application head 60 carried by the handling device 20, which is only shown schematically, and the mixing device 10 with a new mixer 13 in a state already mounted to each other (interface C closed).

Figure 4:
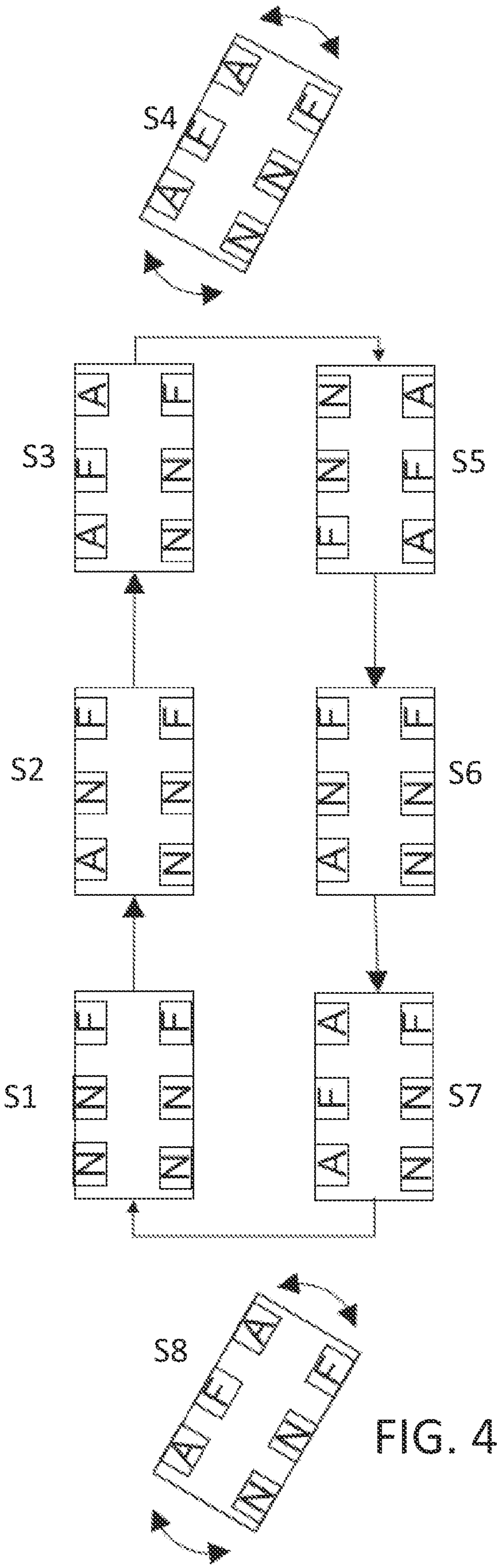
FIG. 4 shows a process sequence that can be carried out by means of the change system.

FIG. 4 shows a process sequence which can be carried out by means of the change system 100.

A indicates a receiver (in particular deposit location) with mixing device with mixer to be changed.

N indicates a receiver (in particular deposit location) with mixing device with new mixer.

F indicates a receiver (in particular deposit location) without mixing device.

S1 symbolizes an initial position of the change station.

S2 symbolizes a first change.

S3 symbolizes a second change.

S4 symbolizes a rotation of the change station.

S5 symbolizes a disposal or removal of a mixer to be changed (and optionally of the base section and/or the application tube).

S6 symbolizes a re-equipping and a first change.

S7 symbolizes a change.

S8 symbolizes a rotation of the change station.

Figure 5:
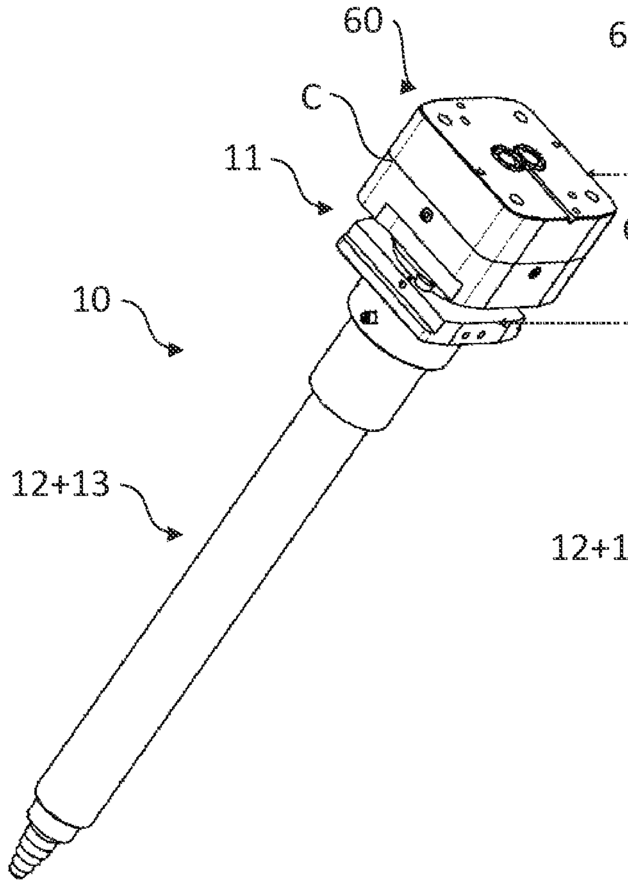
FIG. 5 shows a perspective view of a mixing device and a part of the application head.
Figure 6:
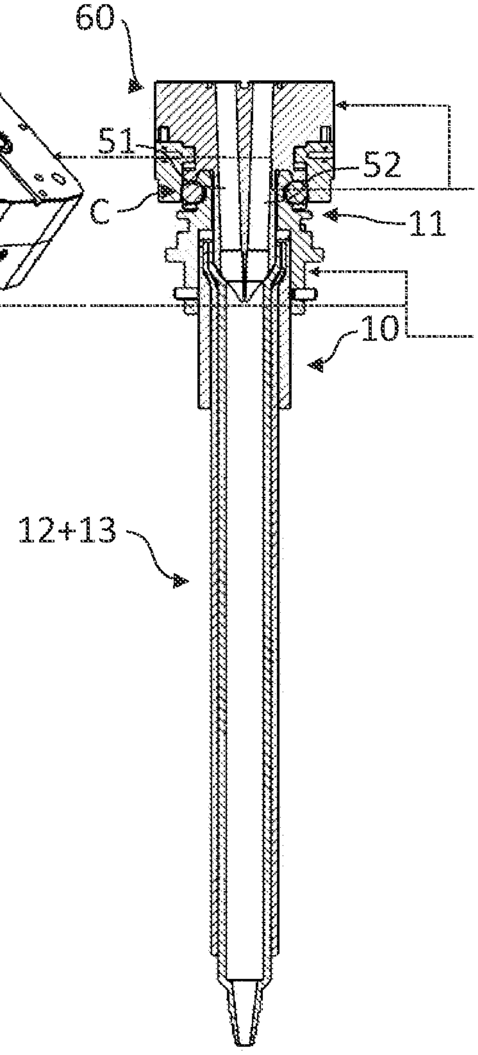
FIG. 6 shows a sectional view of the mixing device and a part of the application head.

FIG. 5 shows a somewhat more detailed perspective view of the mixing device 10 and of a part of the application head 60, wherein FIG. 6 shows an associated sectional view.

The application tube 12 is in particular an elongated component with an outlet opening (e.g. a nozzle) for the in particular mixed multi-component application agent.

The mixer 13, which is not shown in FIGS. 5 and 6, can be accommodated in the application tube 12, for example in a releasable manner.

The base section 11 and the application tube 12 can be mounted to each other, for example in a releasable manner.

Thereby, it can be made possible, for example, that only the mixer 13 to be changed can be changed (e. g. disposed), but, for example, the base section 11 and/or the application tube 12 can be reused with a new mixer 13. The change of the mixer 13 can, for example, be performed manually by a worker or in an automated manner, in particular outside the applicator cell 40.

However, it is also possible, for example, that the mixer 13 to be changed and the application tube 12 can be changed (e.g. disposed), but, for example, the base section 11 can be reused. The change of the mixer 13 and the application tube 12 can be performed, for example, manually by a worker or in an automated manner, in particular outside the application cell 40.

It is also possible to change (e.g. dispose) the mixer 13 to be changed, the base section 11 and the application tube 12, and thus in particular the entire mixing device 10, and to replace it, for example, with a completely new mixing device 10. The change of the substantially complete mixing device 10 can be performed, for example, manually by a worker or in an automated manner, in particular outside the application cell 40.

Figure 7:
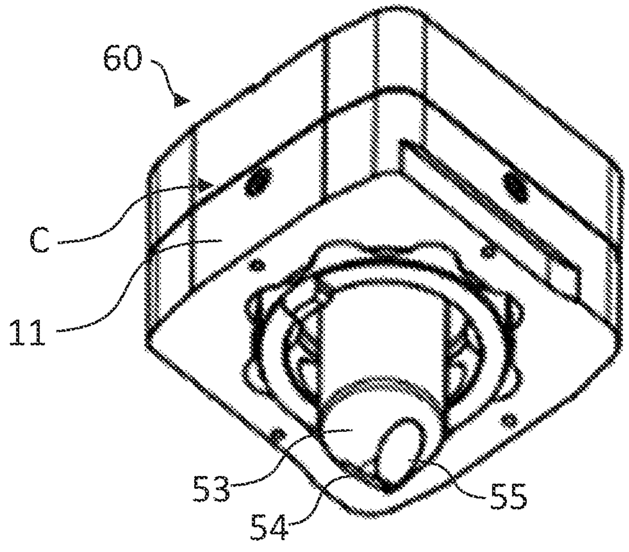
FIGS. 7 and 8 show different perspective views in particular of a part of the mixing device and a part of the application head.
Figure 8:
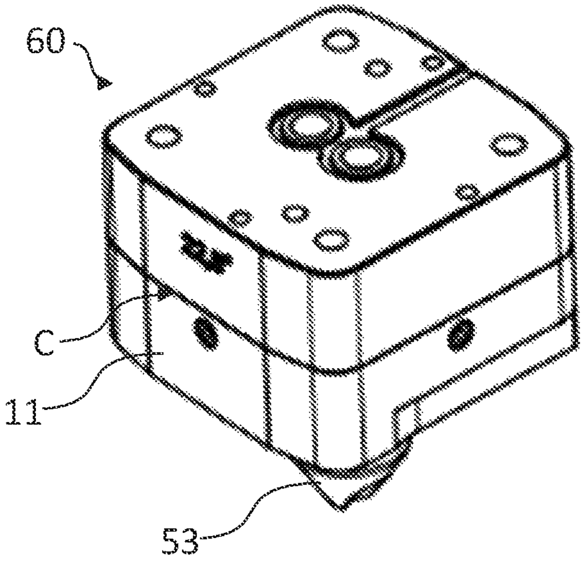

FIGS. 7 and 8 show different perspective views, in particular of the base section 11 and of a part of the application head 60.

FIGS. 7 and 8 show, for example, a tapered section 53 tapering towards the mixer 13, which can in particular be part of a change insert 50, but alternatively can also be part of the base section 11. The tapered section 53 is expediently formed as a taper tip or cone tip.

The at least two separate lines 51, 52 open out via at least two separate outlet openings 54, 55 in the tapered section 53 and can thus preferably extend at least up to the mixer 13, preferably such that mixing is only initiated in the mixer 13.

The tapered section 53 expediently protrudes from the base section 11 and can thus protrude preferably in an at least partially exposed manner into the application tube 12, which is not shown in FIGS. 7 and 8.

FIGS. 9 and 10 show different views, in particular of the base section 11, of a change insert 50 and of a part of the application head 60.

The mixing device 10, in particular the application tube 12, can comprise an inner expediently substantially conical connecting surface 14 for releasable connection (in particular contacting) to the tapered section 53.

The tapered section 53 and the connecting surface 14 can have the same angular position (e.g. planar, concave and/or convex) at least in their contact area, whereby a substantially tight connection between the tapered section 53 and the connecting surface 14 can be ensured, in particular also during mixer changes It is particularly preferred if the tapered section 53 is connected to the conical connecting surface 14 in a prestressed and tight manner.

The at least two separate lines 51, 52 can comprise passage cross sections tapering, for example, towards the mixer 13 and extend, for example, at least partially parallel or at an acute angle to one another.

The at least two separate lines 51, 52 are integrated in the separate change insert 50 in the exemplary embodiment shown in FIGS. 9 and 10. Here, it is possible, for example, that at least one bushing (e.g. a change bushing) is accommodated in the change insert 50 in a preferably releasable manner and the at least one bushing comprises the at least two separate lines 51, 52 or at least one of the at least two separate lines 51, 52.

Bushings with different inner diameters can be provided, such that, for example, different viscosities of the at least two different components can be responded to and, for example, pressures can be adjusted by reducing the inner diameters.

The change insert 50 can be configured, for example, to be inserted, on the one hand, into the mixing device 10 (in particular into the base section 11 and/or into the application tube 12) and, on the other hand, into the application head 60 in a preferably releasable and thus changeable manner. Thus, the change insert 50 can extend, for example, through the interface C.

The tapered section 53 with the two outlet openings 54, 55 protrudes from the base section 11 of the mixing device 10 and expediently projects into the application tube 12 of the mixing device 10, such that the two outlet openings 54, 55 are exposed.

Within the application head 60 and/or within the mixing device 50, there is a sufficient guide length for the change insert 50, what in particular helps to hold the tool center point (TCP).

The change insert 50 comprises, for example, in its lateral surface at least one fastening recess 56, wherein at least one preferably pluggable retaining element 57 (e.g. a bolt or bracket) is provided to retain the change insert 50 in a releasable manner on or in the application head 60 by means of the at least one fastening recess 56.

The application head 60 can comprise at least one fastening opening 58 (e.g. a through hole), for example, in its lateral surface, wherein the at least one retaining element 57 is configured for engaging with the at least one fastening recess 56 and with the at least one fastening opening 58.

The at least one retaining element 57 can be engaged with the change insert 50, for example, from the outside through the application head 60 and can comprise, for example, at least one bolt or bracket for insertion into and withdrawal from the at least one fastening recess 56 and the at least one fastening opening 58.

The fastening recess 56, the retaining element 57 and the fastening opening 58 are preferably formed threadless.

This enables an in particular simple, safe and fast changing of the change insert 50.

The change system 100 can comprise, for example, a control device, wherein the control device is configured to ensure, after reaching an expediently predefined change interval and/or after an expediently sensor-based detection of a mixer 13 to be changed, that a mixing device 10 with a mixer 13 to be changed is deposited in the change station 30 and, preferably, a mixing device 10 with a new mixer 13 is received out of the change station 30.

The control device can also be configured to control movements of the change station 30 and the handling device 20 to be carried out for a changing process.

It should also be mentioned that the application head 60 or a mounting plate can be configured to be able to attach a 2 C mixer changer to the application head 60, to be able to attach, in particular directly, a static mixer with holder and support tube or to be able to mount an SAE flange that enables an attachment of a hose.

The disclosure is not limited to the preferred exemplary embodiments described above. Rather, a large number of variants and modifications are possible which also make use of the concept of the disclosure and therefore fall within the scope of protection. In addition, the disclosure also claims protection for the subject matter and the features of the sub-claims independently of the referenced features and claims.

The invention claimed is:

1. A change system for changing a mixer, comprising:

a mixing device, having the mixer, for mixing at least two different components for a multi-component application agent for application onto a workpiece, and a handling device for moving the mixing device, wherein the change system comprises a change station for depositing the mixing device with the mixer to be changed and for receiving a new mixing device with a new mixer, wherein the mixing device and/or a change insert comprises at least two separate lines to guide the at least two different components separately from each other, wherein the at least two separate lines comprises passage cross-sections tapering towards the mixer, and/or extend parallel and/or at an acute angle to one another, and wherein the change insert comprises a tapered section tapering towards the mixer and the at least two separate lines open out via at least two outlet openings in the tapered section.

2. The change system according to claim 1, wherein the change station is arranged within reach of the handling device and the handling device is configured to position in an automated manner in the change station the mixing device with the mixer to be changed and to receive, in an automated manner, the new mixing device with the new mixer out of the change station.

3. The change system according to claim 1, wherein the handling device is arranged in an application cell, and the change station is arranged at least partially within the application cell, the change station is arranged at least partially outside the application cell, and/or the change station is movable in order to move at least partially into the application cell and at least partially out of the application cell.

4. The change system according to claim 3 wherein the change station comprises at least two receivers including one receiver for the mixing device with the mixer to be changed and at least one receiver for at least the new mixing device with the new mixer.

5. The change system according to claim 4, wherein a contour of the receivers corresponds to a contour of the mixing device, such that the mixing device is fixable relative to its circumferential direction.

6. The change system according to claim 1 wherein the change station comprises a turntable.

7. The change system according to claim 1, wherein the at least two separate lines extend at least up to the mixer.

8. The change system according to claim 7, wherein the tapered section protrudes from a base section of the mixing device, projects into an application tube of the mixing device, and/or is partially exposed in the mixing device.

9. The change system according to claim 8, wherein the mixing device comprises a conical connecting surface for releasable connection to the tapered section.

10. The change system according to claim 9, wherein the tapered section and the connecting surface have an identical angular position in their contact area.

11. The change system according to claim 10, wherein the tapered section is tightly and/or prestressably connectable to the connecting surface.

12. The change system according to claim 1 wherein the handling device carries an application head for supplying the at least two different components to the mixing device and the mixing device comprises an interface for releasable connection to the application head.

13. The change system according to claim 12, wherein the handling device is configured to position in the change station the mixing device with the mixer to be changed and to move the application head, such that the interface is released and the mixing device with the mixer to be changed can be deposited in the change station, and/or to move the application head, such that the interface is closed and the new mixing device with the new mixer can be removed out of the change station.

14. The change system according to claim 1 wherein the mixing device comprises a base section and an application tube, wherein the mixer is accommodated in the application tube and/or the base section comprises an interface for releasable connection to an application head of the handling device.

15. The change system according to claim 14, wherein the change insert is insertable in a releasable manner into the mixing device and/or into the application head, and/or extends through the interface.

16. The change system according to claim 15, wherein the change insert comprises a cylindrical basic structure with different outer diameters for accurately fitting and/or dead space free insertion in the mixing device and/or in the application head.

17. The change system according to claim 16, wherein the change insert comprises at least one fastening recess in its lateral surface and at least one pluggable retaining element is provided in order to fasten in a releasable manner the change insert by means of the at least one fastening recess.

18. The change system according to claim 17, wherein the application head comprises at least one fastening opening and the at least one retaining element is configured for engagement with the at least one fastening recess and with the at least one fastening opening.

19. The change system according to claim 18, wherein the at least one retaining element is engageable with the change insert from outside through the application head and comprises at least one bolt or bracket for insertion into and withdrawal from the at least one fastening recess and the at least one fastening opening.

20. The change system according to claim 1 wherein the handling device comprises a robot having at least 3 degrees of freedom.

21. A change system for changing a mixer, comprising:

a mixing device, having the mixer, for mixing at least two different components for a multi-component application agent for application onto a workpiece, and a handling device for moving the mixing device, wherein the change system comprises a change station for depositing the mixing device with the mixer to be changed and for receiving a new mixing device with a new mixer, wherein the mixing device comprises a base section and an application tube, wherein the mixer is accommodated in the application tube and/or the base section comprises an interface for releasable connection to an application head of the handling device, wherein a change insert is insertable in a releasable manner into the mixing device and/or into the application head, and/or extends through the interface, wherein the change insert comprises a cylindrical basic structure with different outer diameters for accurately fitting and/or dead space free insertion in the mixing device and/or in the application head, and wherein the change insert comprises at least one fastening recess in its lateral surface and at least one pluggable retaining element is provided in order to fasten in a releasable manner the change insert by means of the at least one fastening recess.

* * * * *